A. WOLF.
MIDDLINGS MILL.
APPLICATION FILED MAR. 4, 1918.
1,274,829.
Patented Aug. 6, 1918.
2 SHEETS—SHEET 1.
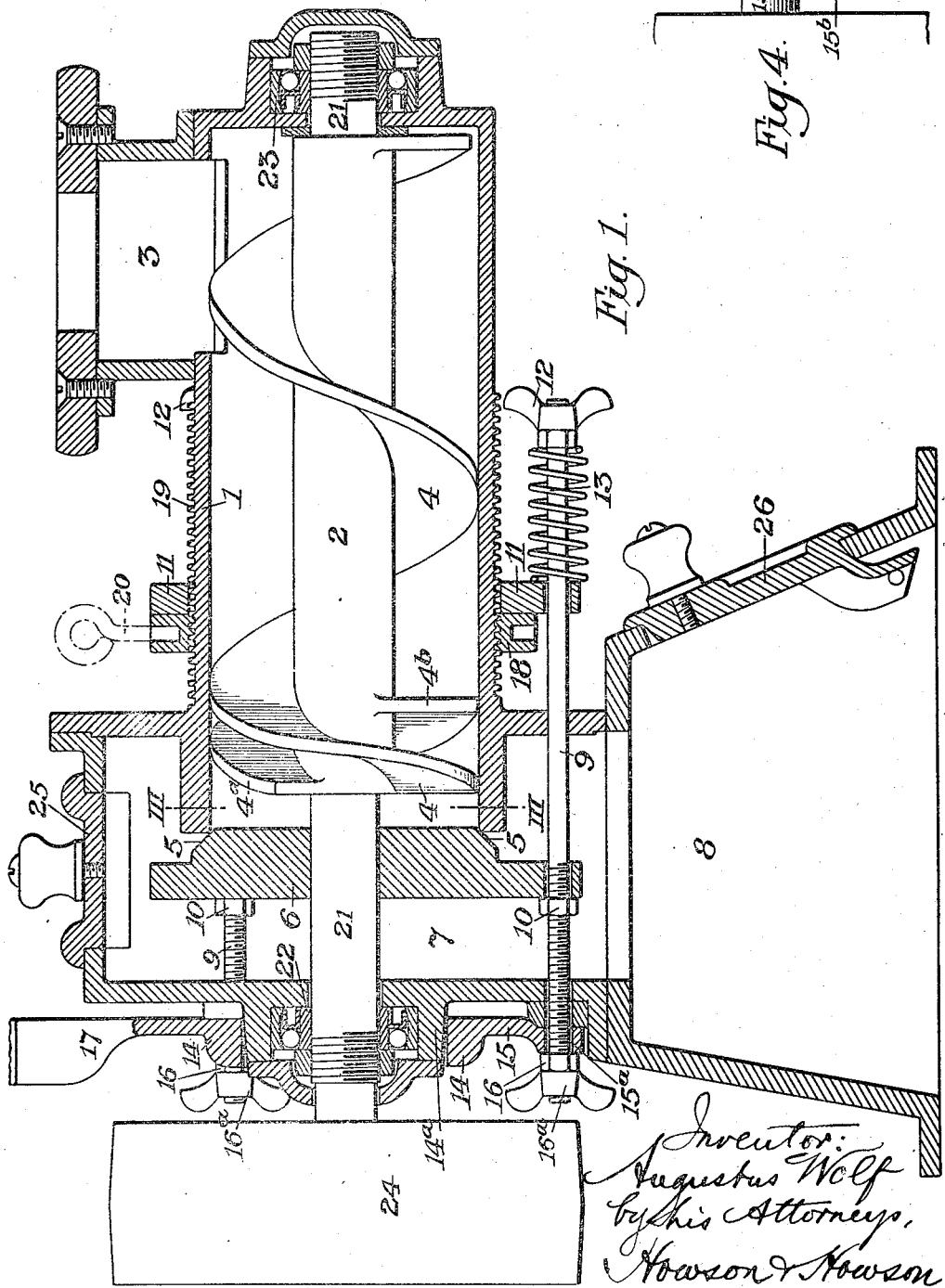

A. WOLF.
MIDDLINGS MILL.
APPLICATION FILED MAR. 4, 1918.
1,274,829.
Patented Aug. 6, 1918.
2 SHEETS—SHEET 2.
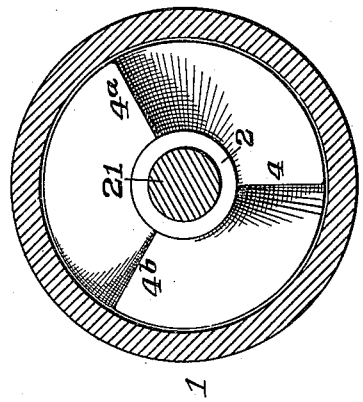
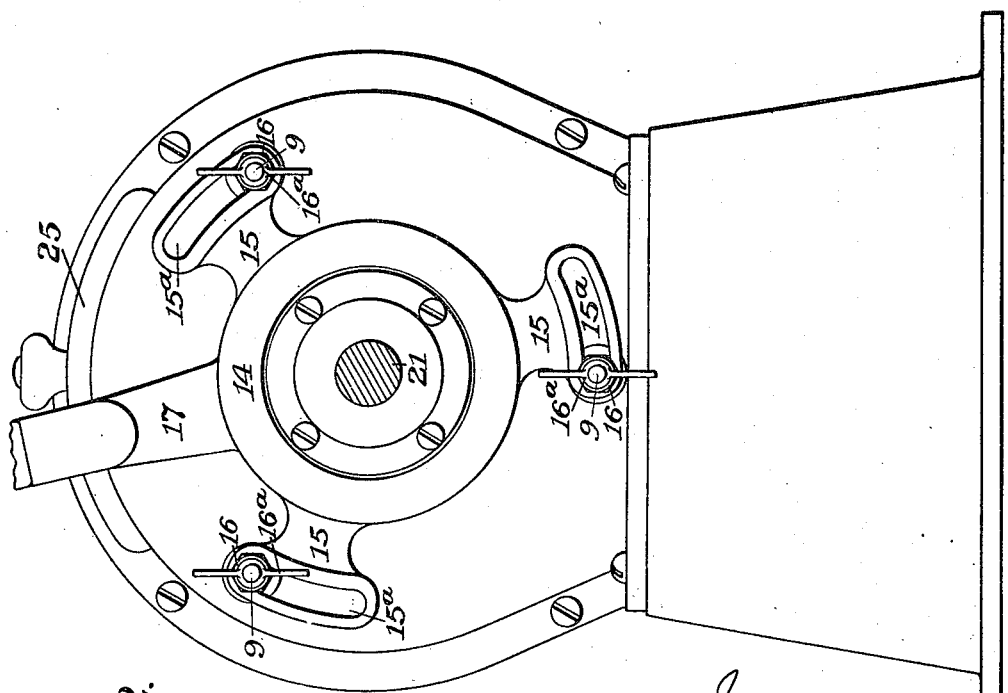

UNITED STATES PATENT OFFICE.

AUGUSTUS WOLF, OF CHAMBERSBURG, PENNSYLVANIA.

MIDDLINGS-MILL.

1,274,829. Specification of Letters Patent. Patented Aug. 6, 1918.

Application filed March 4, 1918. Serial No. 220,203.

*To all whom it may concern:*

Be it known that I, AUGUSTUS WOLF, a citizen of the United States, residing in Chambersburg, Franklin county, Pennsylvania, have invented certain Improvements in Middlings-Mills, of which the following is a specification.

My invention relates to machinery employed in the manufacture of flour, and consists of improved apparatus designed to extract from that form of bran known as "middlings", all of the available flour contained therein. In the usual practice of milling, the "middlings" contain considerable flour that fails to separate therefrom in any of the sifting operations and at the same time is too slight to be crushed by the rolls. In order to secure this flour, I propose to employ mechanism designed to impart a squeezing pressure to the bran; providing means whereby "middlings" carrying flour to be recovered may be forced against a surface in a thin stream. The pressure applied is such as to insure the substantially complete crushing of the bran and flour accompanying the bran to a fineness that will permit of the substantially complete recovery of the flour from the bran.

A further feature of my invention is to provide means for regulating the pressure upon the floury bran at the point of emergence or discharge, and to provide means for quickly releasing the pressure applying parts in order to relieve any strain caused by the presence of foreign material that may become jammed therein.

These and other features of my invention are more fully described hereinafter, reference being had to the accompanying drawings, in which:

Figure 1, is a longitudinal sectional view of the improved milling structure made in accordance with my invention.

Fig. 2, is a front elevation of the same.

Fig. 3, is an end view of the screw, partly in section on the line III—III, Fig. 1, and Fig. 4, is a view illustrating a detail of the invention.

Within a horizontal cylindrical casing 1 a screw 2 is arranged to rotate, and the bran or "middlings" to be moved by said screw is delivered to the casing at the hopper opening 3. The screw 2 has a single thread 4 at the rear portion, which terminates at the forward end of the same and in addition, short threads $4^a$ and $4^b$ are provided at such end, so that for a part of the screw there are three independent threads, individually imparting pressure to discharge the "middlings" at three points separated at all times during rotation of the screw; such arrangement equalizing distribution of the "middlings" and the squeezing pressure thereon, and insuring that the flour being recovered is reduced and extruded under the most advantageous conditions.

The end of the cylinder or casing 1 through which the "middlings" are forced by the screw 2 is cut off squarely at right angles to its axis and abuts the beveled wall 5 of a plate 6 situated outside of and yieldingly held in contact with said end; such plate being disposed in a chamber 7 at the front end of the casing through which the recovered flour drops into the receiver 8 and from which it may pass to sieves or any suitable form of separator. For the purpose of yieldingly holding such plate 6, elongated bolts 9 are provided which pass through said plate and are held thereto by nuts 10; said bolts extending rearwardly for operative connection with a collar 11 encircling the casing. The ends of said bolts are provided with thumb nuts 12 having springs 13 between the same and the collar 11, so that a yielding connection is provided, permitting release of the parts should any foreign matter accompany the flour and be caught at the point where the squeezing operation occurs; between the end of the cylinder 1 and the plate 6.

The outer ends of the bolts 9 are operatively connected with a rotating member 14 mounted on a hub $14^a$ and having arms 15 with slots $15^a$ for the reception of said bolts; the inner surfaces of said arms adjacent said slots being inclined and forming, in effect, cams $15^b$, which engage the inclined surfaces of bosses $15^c$ on the face of the casing through which the bolts 9 pass. These bosses are fixed with respect to the casing, and they may be detachable. Under normal running conditions, the nuts 16 on the bolts, which are locked by the thumb nuts $16^a$, are at the lowest point of these cams so that the plate 6 is in the proper operative position. Should any foreign substance present in the "middlings" be brought by the screw to the point of extrusion and catch there, said plate 6 can be quickly relieved by rotating the member 14 by a handle 17, which will cause the cams to ride on the bosses 15ᶜ and pull the bolts out against the tension of the springs 13, and releasing the pressure applied by the nuts 10 so that the plate 6 may be moved away from the end of the cylinder with which it coöperates to permit removal of such foreign matter.

Pressure is applied to the plate 6 through the springs 13 on the bolts 9, and a nut 18 carried by the cylinder adjacent the ring or collar 11, is employed to increase or decrease this pressure; the cylinder or casing 1 being threaded at 19 for movement of the nut thereon. By turning said nut by means of a pin 20 such as indicated by dotted lines, tension of the springs can be increased or decreased, thereby increasing or decreasing the pressure holding the plate 6 against the end of the cylinder and regulating the amount of pressure applied to the material extruded between the end of such cylinder and said plate.

The screw 2 is carried by a shaft 21 mounted in suitable ball bearing structures 22 and 23 at opposite ends of the machine; the outer end of the shaft having a pulley 24 whereby power may be applied thereto. Access to the chamber 7 is provided by a door 25, and access to the receiver 8 is provided by a door 26.

I claim:

1. The combination of a cylinder, a plate yieldingly held against the end of said cylinder, a screw for moving granular material against said plate whereby it may be extruded in an annular stream, a series of bolts supporting said plate in position, springs on said bolts for applying tension to said plate, a nut for increasing or decreasing said tension; said nut being threaded on the cylinder, and cams for longitudinally moving said bolts to relieve the tension of said springs.

2. In a structure such as set forth in claim 1, a rotatable member having slotted arms through which said bolts pass, and bosses having inclined faces surrounding said bolts; the cams for longitudinally moving said bolts to relieve the tension of the springs being carried by said slotted arms in engagement with said bosses.

AUGUSTUS WOLF.

Copies of this patent may be obtained for five cents each, by addressing the "Commissioner of Patents. Washington, D. C."